April 14, 1959　　G. A. YOUNG, JR., ET AL　　2,881,733
BROODER FOR QUADRUPEDS
Filed Aug. 31, 1953　　　　　　　　　　　　　　4 Sheets-Sheet 1

INVENTORS
GEORGE A. YOUNG, JR.
NORMAN R. UNDERDAHL
RONALD W. HINZ
CLARENCE L. SILBERNICK
BY
ATTORNEYS

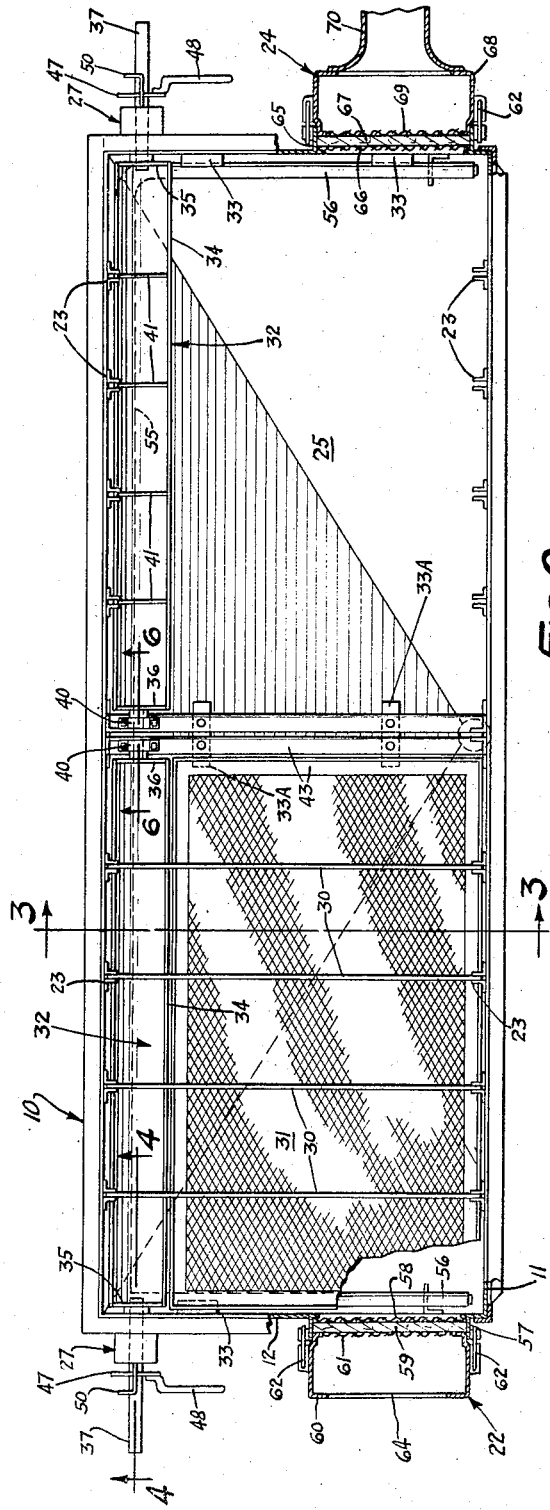

April 14, 1959

G. A. YOUNG, JR., ET AL 2,881,733

BROODER FOR QUADRUPEDS

Filed Aug. 31, 1953

INVENTORS
GEORGE A. YOUNG, JR.
NORMAN R. UNDERDAHL
RONALD W. HINZ
CLARENCE L. SILBERNICK

By Paul, Moore & Rugger
ATTORNEYS

United States Patent Office 2,881,733
Patented Apr. 14, 1959

2,881,733

BROODER FOR QUADRUPEDS

George A. Young, Jr., Norman R. Underdahl, Ronald W. Hinz, and Clarence L. Silbernick, Austin, Minn., assignors to Regents of the University of Minnesota, Minneapolis, Minn., a corporation of Minnesota Application August 31, 1953, Serial No. 377,386

15 Claims. (Cl. 119—15)

This invention relates to brooders for young quadruped animals. More particularly the invention relates to closed brooders in which young quadruped animals may live the first few weeks of their lives under sanitary, substantially germ-free conditions. The multi-unit sanitary brooder of this invention is especially adapted to receive and house under substantially germ-free conditions live young quadruped animals taken from their dams by hysterectomy to avoid the usual contaminating influences attendent upon normal birth and rearing in order to reduce the infant mortality rate, to produce healthy disease-free young animals, and provide a way of interrupting the cycle of reproduction of disease germs in such animals.

In a copending application Serial No. 293,094, filed June 12, 1952 (now Patent No. 2,703,570, issued March 8, 1955), by one of the present inventors, there is disclosed and claimed a method and apparatus for the production of quadruped mammals by hysterectomy. In so far as it is necessary to the understanding of this invention, the disclosure of the aforementioned patent is incorporated herein by reference. The hysterectomy technique described in that application is briefly as follows: A bred female quadruped mammal, such as, for example, pig, sheep, cow, goat, fur-bearing animal or the like, at an appropriate stage of gestation, preferably at or near full term, is immobilized by anesthesia. While the female animal is suitably suspended and while immobilized, an incision is made in the belly of the animal and the gravid uterus is removed intact. Normal sanitary precautions are observed during the hysterectomy operation but as an added precaution the intact gravid uterus is passed through an antiseptic lock into an area maintained at cleanliness levels comparable with those of hospital operating rooms. The passage of the uterus through the antiseptic lock serves to render the outer surfaces of the uterus reasonably aseptic. The uterus is then ruptured and the young quadrupeds begin their existence in an aseptic state comparable with that which they enjoyed in the womb. After the navels of the young animals are tied, the new born germ-free animals are transferred to suitable brooders to spend their first few weeks under nearly sterile and substantially germ free sanitary conditions.

It is the principal object of this invention to provide brooders for young quadruped animals in which these sanitary conditions may be maintained.

It is another object of this invention to provide closed multi-unit sanitary brooders for young quadruped animals in which they may live under substantially germ-free conditions out of contact with normal everyday contaminating influences.

Another object of this invention is to provide closed multi-unit sanitary brooders for young quadrupeds adapted to maintain the animals under near sterile conditions and having closed feeding, ventilating and cleaning systems.

A further object of this invention is to provide a multi-unit brooder for rearing healthy disease-free young pigs taken from their dams by hysterectomy.

A still further object of this invention is to provide an arrangement for a pig hatchery employing the brooders of this invention.

Other objects of this invention will become apparent as the description proceeds.

To the accomplishment of the foregoing and related ends this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings in which corresponding numerals refer to the same parts and in which:

Figure 2 is a somewhat enlarged top plan view of a multi-unit sanitary brooder shown with the cover removed and a portion of the floor broken away;

Figure 4 is an enlarged fragmentary vertical section, taken along the line and in the direction of the arrows 4—4, of Figure 2;

Figure 5 is an enlarged elevation, partly in section, of the means for introducing feed into the brooder and for positioning the feed trays, taken along the line and in the direction of the arrows 5—5 of Figure 4;

Although the brooder will be described with particular reference to little pigs it is to be understood that the invention is not so limited, but on the contrary, is adapted to house other young quadruped mammals, such as for example, lambs, calves, the young of various fur bearing animals and the like.

Figure 1:
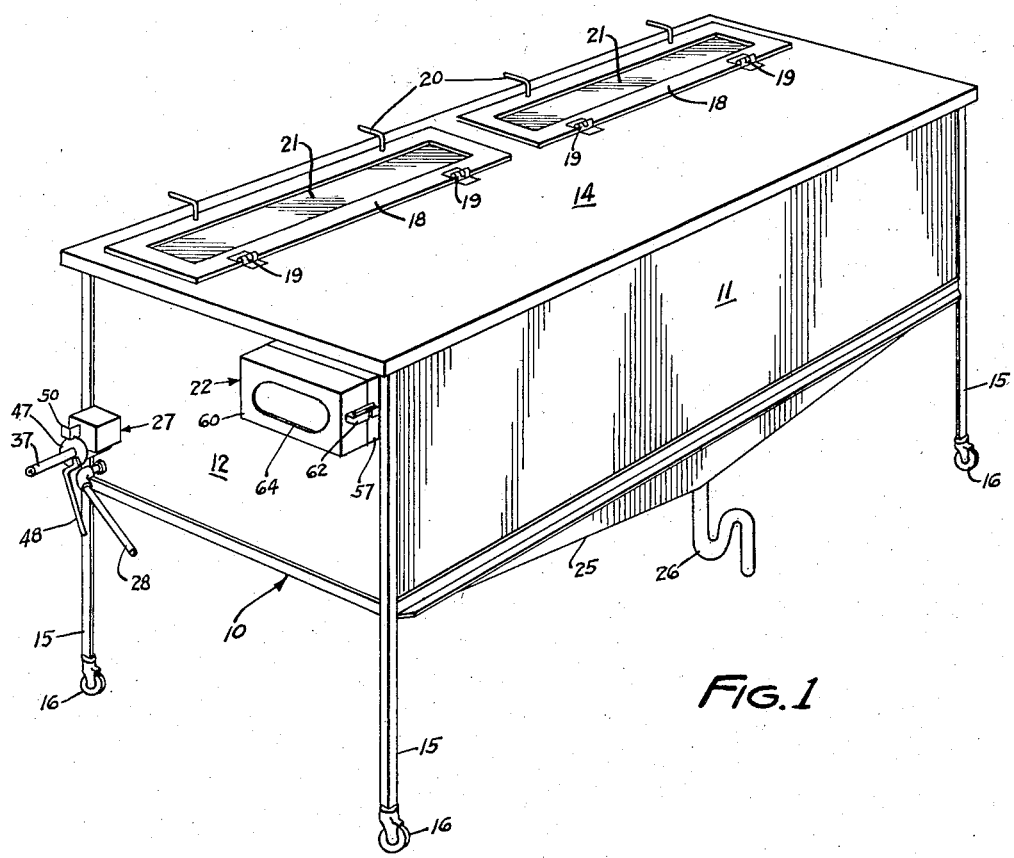
Figure 1 is a perspective view of a closed multi-unit sanitary brooder constructed in accordance with this invention.
Figure 6:
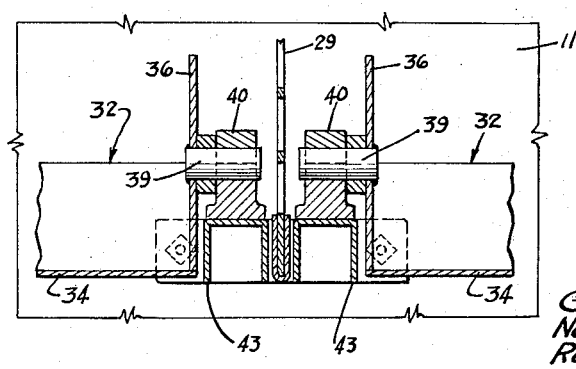
Figure 6 is a vertical section, taken along the line and in the direction of the arrows 6—6, of Figure 2.
Figure 3:
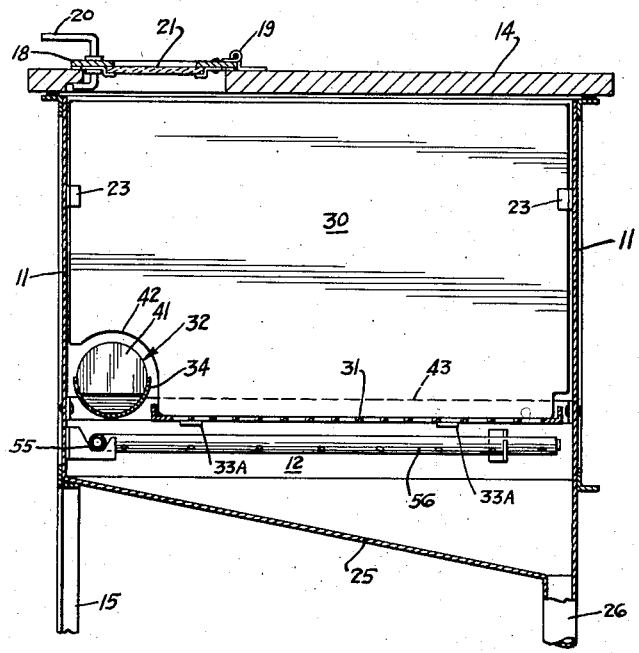
Figure 3 is an enlarged end elevation, in section, taken along the line 3—3, and in the direction of the arrows, of Figure 2.

Referring now to the drawings, and particularly to Figure 1, there is here illustrated in perspective view, a closed multi-unit brooder constructed according to this invention. The brooder indicated generally at 10 comprises a generally rectangular shaped box having sides 11 and ends 12 and a tightly fitting gasketed removable cover 14. The brooder rests upon four legs, 15 preferably provided with casters 16. The cover 14 is provided with two rectangular ports for introducing animals into the brooder. Each port is provided with a tightly fitting cover 18 hinged at 19 and held down by two clamping locking devices 20. The central panel 21 in each of the port covers is made of a substantially pressure tight setting of glass or similar transparent sheet material in order to provide an observation window into the brooder. The brooder is provided at one end with an air inlet indicated generally at 22 and an air exhaust or outlet indicated generally at 24 (Figure 2) at the other end. The sections forming the bottom 25 of the brooder slant slightly downwardly to the center of one side of the brooder, and terminate in a gooseneck outlet 26 to the sewer. One form of means, indicated generally at 27 (and shown in detail in Figures 4 and 5) are provided for introducing feed into the brooder and for setting the position of the feed troughs or trays within the brooder. Inlet means are provided at 28 for introducing water into the internal cleaning system of the brooder.

The interior construction of one form of the brooder is shown in detail in Figures 2, 3, 4 and 6. In the form here shown a divider 29 (Figure 6) preferably formed of wire mesh or similar perforate sheet material, separates the brooder housing into two compartments, each capable of handling five baby pigs up through about four weeks of age. Other removable dividers or partitions 30 divide the larger compartments into individual apartments each adapted to house one young pig. These removable partitions are preferably formed of sheet metal. Because new born pigs have a natural tendency to nurse some object to obtain food if they are placed together they tend to nurse one another's ears and tails or other protuberances. It is essential, therefore, that they be separated during the early days of their lives until they have learned to feed from the feed troughs. Thereafter the dividers may be removed if desired. All of the dividers are held between clips 23 for easy removal. A removable perforated floor 31 is positioned in the lower portion of the brooder housing resting upon brackets 33 and 33A spaced apart from the bottom. The floor 31 extends over the entire bottom of the brooder housing except for a narrow space adjacent one of the side walls adapted to receive the feeder trays or troughs indicated generally at 32.

In the form here illustrated each brooder is provided with two feed trays, each of which serves five individual compartments. Each feed tray comprises an elongated semi-circular trough 34 having circular end plates 35 and 36. End plate 35 is intersected by a tubular feed inlet 37 which is welded to the end plate and extends out of the brooder journaled in a reinforcing bearing structure in the end wall 12 of the brooder housing (shown in detail in Figure 4). A short section of rod 39 welded to end plate 36 journaled in bearing structure 40 supports the opposite end of the feed tray. The feed trays are provided with semi-circular divider fins 41 which extend up into corresponding semi-circular openings 42 in the partitions 30 to prevent the young pigs from butting one another while feeding. Bearings 40 rest on channel irons 43 which form two side by side cross beams across the brooder housing.

As best shown in Figures 4 and 5 feed inlet 37 extends out through the end of the brooder, through a latch housing 44, for connection to a source of liquid feed supply. An annular plate 47 provided with a handle 48 is welded to the feed inlet tubing to provide for rotation of the feed tray. The perimeter of plate 47 is provided with three slots 49 for engagement with latch 50 for locking the feed tray into any of three positions, upright for receiving feed at full capacity, tilted at an angle to create a shallow trough for starting new born baby pigs or inverted for washing. Obviously other intermediate locking positions may be provided, if desired, by merely cutting additional slots in the perimeter of plate 47.

Latch 50 rests in a slot in the latch housing and is pivoted at 51. The reinforcing bearing structure into which feed tube 37 is journaled to support the end of the feed tray 32 and provide a sealed feed introduction means, comprises a reinforcing threaded pipe flange 45 fixed to the wall of the brooder housing and having a threaded nipple 46. A nut 52 having a central aperture therethrough, threaded onto threaded nipple 46 forms the bearing member for tube 37 and holds packing 53 in place to provide a tight seal against introduction of atmospheric air into the brooder housing.

Means for washing the feed trays and the bottom of the brooder housing are provided as follows: An inlet 28 at one end of the brooder communicates with sections of perforated tubing 55 and 56 which are positioned around the edge of the brooder housing below the level of the floor 31. Tubing 55 is disposed generally along one side wall of the brooder under the feed trays and has perforations in its upper surfaces for directing fine jets or streams of warm water upwardly into the feed trays when they are locked in inverted position for washing. Tubing 56 may be disposed generally along the other side and ends of the brooder (or merely along the ends) and has perforations in its lower surfaces for directing streams of warm water downwardly against the bottom 25 of the brooder for washing litter away which drops to the bottom of the brooder from the perforated floor. The sections making up the bottom 25 of the brooder housing are slanted downward to a central trapped outlet 26 to the sewer to facilitate washing of the feed trays and bottom of the brooder. It is a feature of the invention that feed may be introduced, the feed trays may be washed after feedings and the litter may be washed away, all without opening the brooder to admit contaminating materials.

It is also a feature of this invention to provide for the maintenance of a substantially germ free atmosphere within the brooder. The air inlet is indicated generally at 22. The inlet comprises generally a rectangular frame 57 holding a perforated sheet or wire mesh 58 forming a grid over the opening into the brooder. Frame 57 is adapted to hold a filter pad 59, such as a glass fiber mat, which is effective in removing 99% of bacteria from the air. The filter pad 59 is held in place in the frame by a complementary pad holder 60 having a perforated grid 61 which seats in frame 57 sandwiching the filter pad between the two grids. Pad holder 60 is held in place by snap fasteners 62. Air is drawn through an opening 64 in the pad holder to the filter and into the brooder. The air outlet or exhaust is similarly constructed having a generally rectangular frame 65 holding a false grid 66 over the outlet in the wall of the brooder housing and adapted to receive a filter pad 67. Here too the filter pad is held in place in the frame by a pad holder 68 having a perforated grid 69 which presses down upon the filter pad and holds it in place when the pad holder is seated in frame 65 and held by snap fasteners 62. Pad holder 68 is fitted with an exhaust duct 70 adapted to be connected to an exhaust system equipped with a blower for drawing air through the brooder and maintaining a slight negative pressure within the brooder. A damper (not shown) in the exhaust duct, may be used to vary the flow of air through the brooder.

Figure 7:
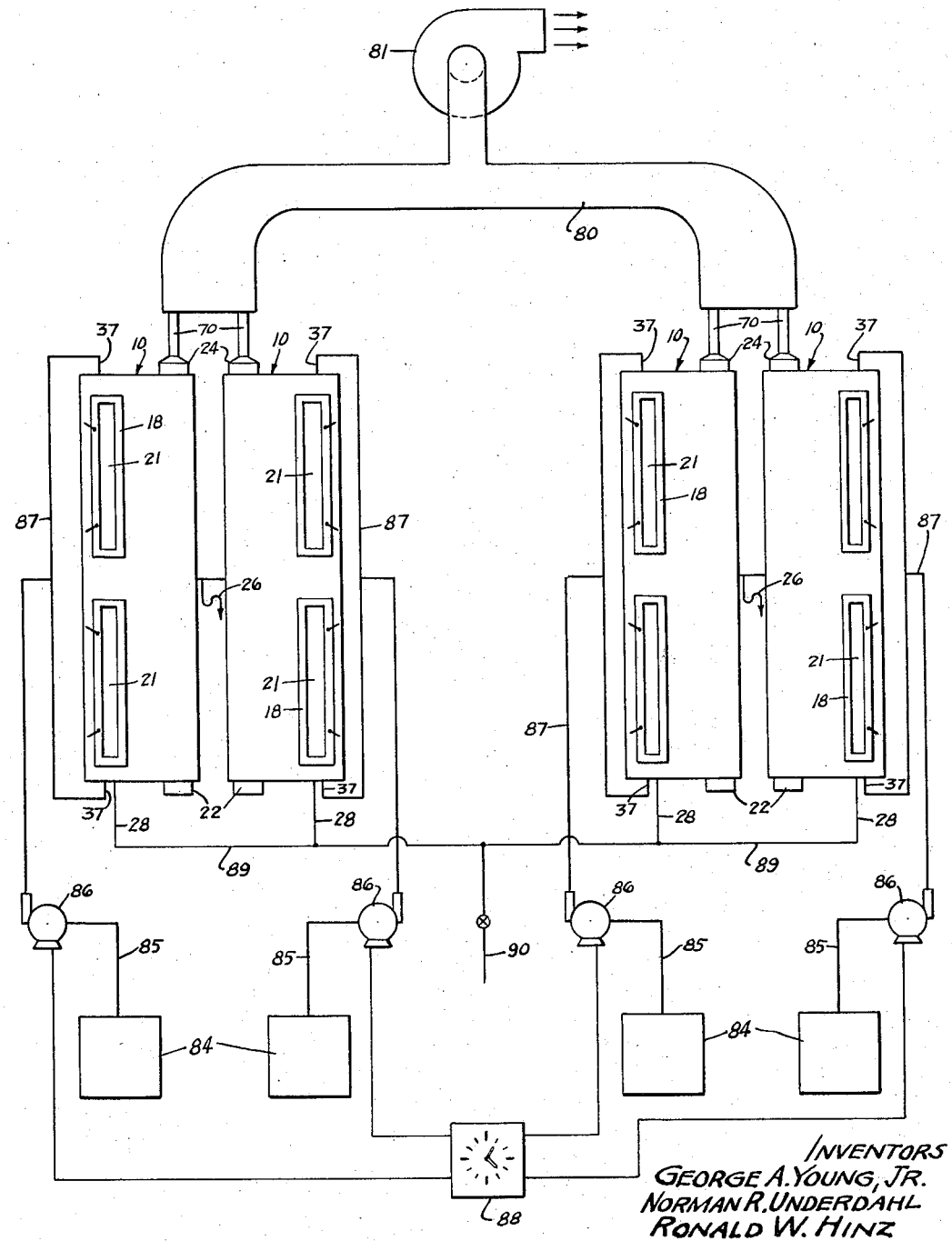
Figure 7 is a diagrammatic and schematic representation of an arrangement for pig hatchery comprising a battery of closed brooders provided with a common ventilating system, automatic feeding system and cleaning system.

Since the brooder is especially adapted for use in operating a so-called pig "hatchery" which would require the handling of relatively large numbers of pigs for economic operation, there is shown in Figure 7 a diagrammatic and schematic representation of an arrangement for a battery of closed brooders provided with a common ventilating system, automatic feeding system and cleaning system. Although the arrangement as illustrated is for a battery of four brooders accommodating a total of 40 little pigs it is obvious that the same or similar arrangements may be made for any number of brooders.

The brooders 10 are lined up so that the air exhaust ducts 70 of each individual brooder may make connection with a common duct 80 communicating directly with an exhaust blower 81 of capacity sufficient to accommodate all of the brooders, and provide them with a constant, fresh, substantially germ-free atmosphere. Feed for the little pigs is introduced into feed inlets 37 to the feed trays 32 from a refrigerated supply tank or container 84 through a closed system comprising lines 85 to a pump 86 operated by an electric motor and lines 87 to the feed inlet of the brooder. The motor for pump 86 is controlled by an automatic timer 88 which periodically starts the motor causing feed to be pumped to the feed trays.

During the first few weeks of their lives which are spent in the brooders the yong pigs are fed a basic milk diet of pasteurized homogenized whole milk. This basic diet may be supplemented and enriched by the addition of cream, eggs, vitamins and the like as desired, particularly for the newborn pigs. The automatic timer is set normally to provide a feeding at predetermined intervals, as for example every three hours. Because the feed is sterile and the system is closed there is no opportunity for the admission of foreign contaminating substances into the brooder during feedings. The feed supply lines are flushed periodically, at least once a day, with warm water containing a little commercial detergent. In the arrangement illustrated each brooder unit is provided with its separate feed supply, pump and supply lines. This is to permit variations in the diets of the yong pigs in the several units, as for example, where they are of different age groups. If all of the pigs are on the same diet they may, of course, be supplied from a single source. Instead of employing pumps as illustrated, a gravity flow system equipped with automatically controlled valves may be used. If around-the-clock labor is available the automatic controls may be replaced with manual controls.

The cleaning and flushing system is also closed to prevent the introduction of contaminating influences from this source. The water inlets 28 of each of the brooders is joined by means of lines 89 to a common source of water 90, preferably warm water. This water is introduced periodically into tubing 55 and 56 for washing down the feed trays which are inverted over tubing 55 and the bottom of the brooder housing. To maintain a closed system a trap at 26 may be used.

It is desirable that the temperature of the air within the brooder be kept relatively high, for example, between 90° and 100° F. for newborn pigs and between 80° and 90° F. for young pigs 2 to 4 weeks old. This may be accomplished by maintaining the temperature of the room in which the brooders are kept at these temperatures. This is the expedient used in the arrangement illustrated in Figure 7. Where it is not feasible to maintain the room temperatures at these relatively high levels, particularly in large operations, air may also be introduced through a separate common air inlet duct in which the air may be filtered, dehumidified and heated to the desired temperature for passage through the brooder units.

Each of the brooders is preferably mounted on casters 16 for easy mobility. This facilitates loading and unloading of the pigs in an area removed from the actual operations area. It also permits removal of the brooder for cleaning and disinfecting between successive batches of little pigs. So far as it is possible it is desirable to sterilize all parts of the brooder, the feed lines and pumps, and even the ventilating system after each batch of little pigs is produced. The exhaust system may be disinfected by use of an appropriate sterilizing gas such as formaldehyde.

Figure 8:
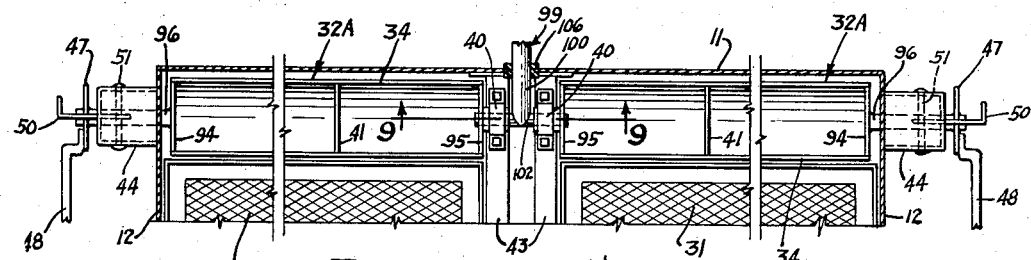
Figure 8 is a top plan view of a modified and alternative form of feeder trough for the brooder of this invention.
Figure 10:
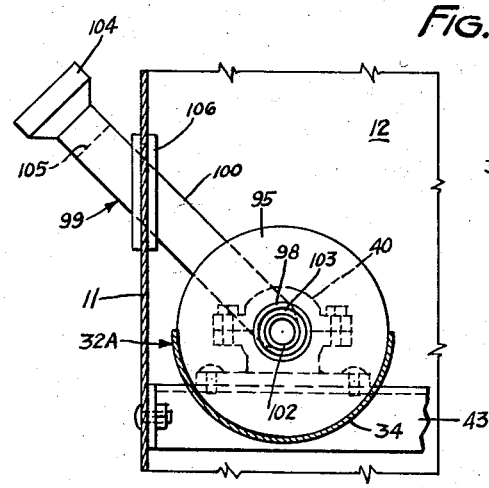
Figure 10 is a sectional side elevation taken along line 10—10, and in the direction of the arrows, of Figure 9.
Figure 9:
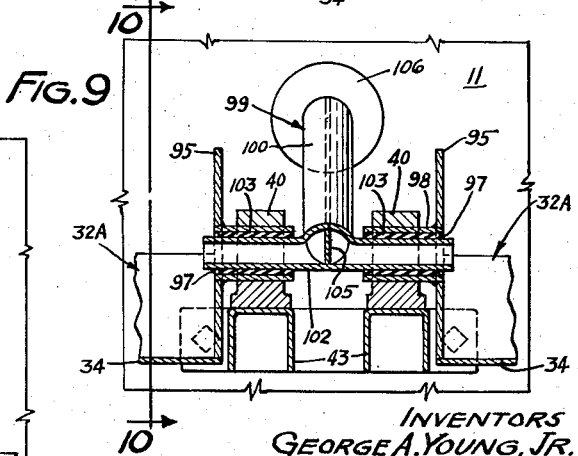
Figure 9 is an enlarged fragmentary front sectional elevation taken along line 9—9, and in the direction of the arrows, of Figure 8 showing the central feed introducing means of the modified form of feeder trough which is part of this invention.

In Figures 8, 9 and 10 there is illustrated a somewhat simplified and alternative form of construction of feed inlet means for the brooder employing but a single feed inlet for each brooder. The form of construction here shown serves to reduce the number of feed lines to be maintained and at the same time insures even distribution of the liquid feed to both halves of the brooder. The feed troughs or trays 32A are constructed similar to the form described above and comprise a semicircular trough 34 having circular end plates 94 and 95. A short section of rod or tubing 96 is welded to the center of the outside surface of end plate 94. Tubing 96 extends out through the end of the brooder and is journaled in the reinforcing bearing structure in the end wall 12 of the brooder for supporting the tray for rotation in the same manner as feed inlet 37 shown in Figure 4. Tubing 96 extends through latch housing 44 and is provided with an annular plate 47 slotted for engagement with latch 50 for locking the feed tray in position and having a handle 48 for rotating the tray. End plate 95 has a central aperture 97 (Figure 9). A short length of tubing 98 is welded to the outside face of end plate 95 and is journaled in bearing structure 40 for supporting the feed tray for rotation. The feed trays are provided with divider fins 41 as described above.

The feed trays are provided with the liquid feed from a central T-shaped feed inlet 99 having a tubular stem 100 intersecting the side wall 11 of the brooder housing and terminating in a tubular T-head 102 the ends of which extend through the tubular supports 99 held in bearings 40 and through central apertures 97 to the ends of the feed trays. The tubular head 102 should have at least a loose sliding fit within tube 98 to permit relative rotation of the feed tray 32A against tube 99 or tube 98 may be provided with a bearing 103 in which the feed tray may rotate on tube 102. The feed inlet is provided with a union 104 for connection to a feed line at its end outside of the brooder housing and is provided with a divider fin 105 centrally disposed within the inlet for evenly dividing the stream of feed into the feed trays. Suitable packing 106 is provided around the inlet at its intersection of wall 11 in order to insure against the introduction of atmospheric air to the inside of the brooder.

As mentioned above, although not limited thereto, the brooders of this invention are especially adapted to receive and house the newly born pigs which are taken by hysterectomy by the technique described in the aforementioned Patent No. 2,703,570. These young pigs are born in a substantially germ-free state and are maintained in that state for several weeks after which they are placed on the farm for growth, fattening and eventual butchering. It has been found that such young pigs begin their lives in a state of improved health and enhanced well-being vastly superior to that of normally born pigs which, even though produced under the best of environmental conditions, are still exposed to contamination on infection from passage through the birth canal, from nursing their dam and even inspiration of contaminated air in the environment of the dam. The beneficial effects of being reared under the disease-free conditions in the brooder of this invention are reflected in substantially lowered infant mortality rates as compared with normal birth and in faster and more efficient growth after being placed on the farm.

As many apparently widely different embodiments of this invention may be made without departing from the spirit and scope thereof, it is to be understood that we do not limit ourselves to the specific embodiments herein.

What we claim is:

1. A sanitary brooder for live young quadruped mammals which comprises a closed brooder housing, air filter means in the walls of said housing for introducing and maintaining a substantially germ-free atmosphere within said housing, at least one feed trough for introducing feed into said housing and means in the walls of said housing for introducing sterile feed into said feed troughs from outside of the housing.

2. A sanitary brooder for live young quadruped mammals which comprises a closed brooder housing, air filter means in the walls of said housing for introducing and maintaining a substantially germ-free atmosphere within said housing, a perforated floor spaced apart from the bottom of said housing, at least one feed trough adjacent to said floor for introducing feed into said housing, means in the walls of the housing for introducing sterile feed into said feed troughs from outside of the housing, flushing means within the housing for flushing said feed troughs and the bottom of said brooder housing, means in the walls of the housing for introducing water from outside of the housing to said flushing means.

3. A sanitary multiple unit brooder for live young quadruped mammals which comprises a closed brooder housing, air filter means in the walls of said housing for introducing and maintaining a substantially germ-free atmosphere within said housing, means extending between the walls of the housing for dividing said housing into a plurality of animal-containing compartments, at least one feed trough for introducing feed into said animal-containing compartments and means in the walls of said housing for introducing sterile feed into said feed troughs from outside of the housing.

4. A sanitary multi-unit brooder for live young quadruped mammals which comprises a closed brooder housing, a perforated floor spaced apart from the bottom of said housing, air filter means in the walls of said housing for introducing and maintaining a substantially germ-free atmosphere within said housing, wall means extending between the walls of the housing for dividing said housing into a plurality of animal-containing compartments, at least one feed trough adjacent to the floor in said housing for introducing sterile feed into said animal-containing compartments, means in the walls of said housing for introducing feed into said feed troughs from outside of the housing, flushing means within said housing for flushing said feed troughs and the bottom of said housing, and means in the walls of the housing for introducing water from outside of the housing to said flushing means.

5. A sanitary multi-unit brooder for live young quadruped mammals which comprises a brooder housing closed to atmospheric air, filter and duct means in the walls of the housing for introducing and maintaining a substantially germ-free atmosphere within said housing a perforated floor spaced apart from the bottom of said housing, vertical partition means extending between the walls of the housing for dividing said housing into a plurality of animal-containing compartments, at least one feed trough adjacent to the floor within the housing for introducing feed into said animal-containing compartments, means in the walls of the housing for introducing feed into said feed troughs, flushing means within said housing for flushing said feed troughs and the bottom of said housing, and means in the walls of the housing for introducing water from outside of the housing to said flushing means.

6. A brooder according to claim 5 further characterized in that the feed troughs are rotatable within the housing for adjustment of their capacity and ease of flushing.

7. A brooder according to claim 5 further characterized in that the partitions separating the animal-containing compartments are removable.

8. A brooder according to claim 5 further characterized by at least one transparent observation port.

9. A brooder according to claim 5 further characterized in that the means for introducing and maintaining a substantially germ-free atmosphere within said brooder housing comprises an air inlet duct, a filter within said inlet duct capable of removing substantially all bacteria from the air, an air outlet duct and adapter means for connecting said outlet duct to fan means for drawing air in through said inlet duct and filter and out through said outlet duct whereby a slight negative pressure is maintained within said brooder housing.

10. A closed, sanitary multi-unit brooder for young quadruped animals comprising a brooder housing, at least one port therein for introducing or removing animals, a port cover, a perforated floor in said housing spaced apart from the bottom thereof, sewer outlet means in the bottom of said housing, a plurality of vertical partitions extending between the walls of the housing for dividing said housing into compartments, elongated feed tray means along one wall of said housing adjacent said perforated floor and communicating with each of said compartments, inlet means in the walls of said housing for introducing sterile feed to said tray means from outside of the housing, pivotal support means in the housing walls at the ends of the feed tray for rotating said tray means, elongated perforated tube means adjacent the bottom and side walls of said housing below the level of the perforated floor, inlet means in the walls of the housing for introducing water from outside of the housing to said perforated tube means, air inlet means and air exhaust means in the walls of the housing.

11. A closed, sanitary multi-unit brooder for young quadruped animals comprising a brooder housing having a top, a bottom and side walls, said top having at least one port therein for introducing or removing animals and a port cover, said bottom slanting downwardly to a sewer outlet, a perforated floor in said housing spaced apart from the bottom thereof, a plurality of vertical partitions extending between the walls of the housing for dividing said housing into compartments, at least one elongated feed tray along one wall of said housing adjacent said perforated floor and communicating with said compartments, inlet means in the walls of the housing for introducing feed into said feed trays from outside of the housing, pivotal support means in the housing walls at the ends of the feed trays for rotating said feed trays, elongated perforated tube means adjacent the bottom and side walls of said housing below the level of the perforated floor, inlet means in the walls of the housing for introducing water from outside of the housing to said perforated tube means, air inlet means and air exhaust means in the walls of the housing.

12. A closed, sanitary multi-unit brooder for young quadruped animals comprising a brooder housing having a top, a bottom and four side walls, said top being a tightly fitting removable cover provided with at least one port therein for introducing or removing animals and a partially transparent port cover, said bottom slanting downwardly to a goose-necked sewer outlet, a horizontal perforated floor in said housing spaced apart from the bottom thereof, a plurality of removable vertical partitions extending between opposite side walls of the housing for dividing said housing into a plurality of horizontally spaced compartments, at least one elongated feed tray running along one wall of said housing adjacent said perforated floor and communicating with said compartments, inlet means in the walls of the housing for introducing sterile feed from the outside of the housing into said feed trays, pivotal support and locking means in the walls of the housing at the ends of the feed trays for rotating and locking said feed trays, elongated perforated tube means adjacent the bottom and side walls of said housing below the level of the perforated floor, inlet means in the walls of the housing for introducing water from outside of the housing to said perforated tube means for cleaning the feed trays and the bottom of the housing, air inlet means and air exhaust means in the walls of the housing.

13. A brooder according to claim 12 further characterized in that the perforations in said elongated perforated tube means are on the top surfaces thereof adjacent the feed trays and on the bottom surfaces thereof elsewhere throughout its length.

14. A pig hatchery comprising a plurality of closed sanitary multi-unit brooders provided with internal feeding means, inlet means in the walls of each of said brooders for introducing sterile feed from outside of the brooders to said internal feed means, internal cleaning and flushing means, inlet means in the walls of each of said brooders for introducing cleaning water from outside of said brooders to said internal cleaning and flushing means, and air intake and exhaust means, ventilating means in the walls of each of said brooders common to each of said brooders in communication with said air means maintaining a constant fresh substantially germ-free atmosphere within said brooders, feed supply means for the feed inlet means of each of said brooders connected to said internal feeder means, timer means operatively connected to said feed supply means for periodically permitting flow of feed to said internal brooder feeding means and a source of water common to each of said brooders for introducing water to the inlet means of said internal cleaning and flushing means.

15. A pig hatchery comprising a plurality of closed sanitary multi-unit brooders, each of said brooders provided with internal feeding means and an inlet in the walls of said brooder for introducing feed to said means from outside of the brooder, filter air inlet and air exhaust means in the walls of said brooder, an internal cleaning and flushing system and an inlet in the walls of said brooder for introducing water to said cleaning and flushing system, ventilating means common to each of said brooders in communication with said air means for maintaining a constant fresh substantially germ-free atmosphere within said brooders, feed supply means comprising a refrigerated feed supply tank and supply lines from said supply tank to the feed inlets of said brooders, timer means operatively connected to said feed supply means for periodically permitting flow of feed to said internal brooder feeding means and a source of water common to each of said brooders for introducing water from outside of the brooders to the water inlets of the cleaning and flushing systems of the brooders.

References Cited in the file of this patent

UNITED STATES PATENTS

| | | |
|---|---|---|
| 394,955 | Butler | Dec. 25, 1888 |
| 408,691 | Burton | Aug. 13, 1889 |
| 453,804 | Fischer | June 9, 1891 |
| 1,037,054 | Rose | Aug. 27, 1912 |
| 1,922,086 | Hart | Aug. 15, 1933 |
| 1,927,416 | Petry | Sept. 19, 1933 |
| 1,936,978 | Casey | Nov. 28, 1933 |
| 1,999,526 | Mudd | Apr. 30, 1935 |
| 2,026,334 | Wilkinson | Dec. 31, 1935 |
| 2,523,615 | Fell | Sept. 26, 1950 |
| 2,660,981 | Jorenby | Dec. 1, 1953 |
| 2,661,800 | Reichenbach | Dec. 8, 1953 |
| 2,698,004 | Luther | Dec. 28, 1954 |

FOREIGN PATENTS

| | | |
|---|---|---|
| 462,557 | Great Britain | Mar. 11, 1937 |
| 124,164 | Sweden | Mar. 1, 1949 |

UNITED STATES PATENT OFFICE
CERTIFICATE OF CORRECTION

Patent No. 2,881,733                                                  April 14, 1959

George A. Young, Jr., et al.

It is hereby certified that error appears in the printed specification of the above numbered patent requiring correction and that the said Letters Patent should read as corrected below.

Column 3, line 61, for "unpright" read -- upright --; column 5, lines 6 and 21, for "yong", each occurrence, read -- young --; column 9, line 1, for "means maintaining" read -- means for maintaining --.

Signed and sealed this 25th day of August 1959.

(SEAL)
Attest:

KARL H. AXLINE                                            ROBERT C. WATSON
Attesting Officer                                      Commissioner of Patents